(12) United States Patent
Lee

(10) Patent No.: US 7,420,634 B2
(45) Date of Patent: Sep. 2, 2008

(54) TFT LCD AND FABRICATING METHOD THEREOF HAVING PARTICULAR REFLECTION BUMPS WITH STACKED STRUCTURE

(75) Inventor: Hsin-Ta Lee, Taoyuan County (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 446 days.

(21) Appl. No.: 10/908,705

(22) Filed: May 23, 2005

(65) Prior Publication Data
US 2006/0170845 A1    Aug. 3, 2006

(30) Foreign Application Priority Data
Feb. 1, 2005    (TW) .............................. 94103078 A

(51) Int. Cl.
*G02F 1/1335*    (2006.01)
*G02F 1/136*    (2006.01)

(52) U.S. Cl. .......................... 349/114; 349/113; 349/43

(58) Field of Classification Search ................. 349/114, 349/113, 43
See application file for complete search history.

(56) References Cited

U.S. PATENT DOCUMENTS

| 5,548,425 | A | 8/1996 | Adachi et al. | |
|---|---|---|---|---|
| 6,638,869 | B2 * | 10/2003 | Lai | 438/694 |
| 6,667,241 | B2 * | 12/2003 | Lai | 438/694 |
| 6,692,899 | B2 * | 2/2004 | Lai | 430/311 |
| 6,716,680 | B2 * | 4/2004 | Lai et al. | 438/149 |

FOREIGN PATENT DOCUMENTS

| TW | 512536 | 12/2002 |
|---|---|---|
| TW | 594351 | 6/2004 |

* cited by examiner

*Primary Examiner*—Mike Qi
(74) *Attorney, Agent, or Firm*—Wei Te Chung

(57) ABSTRACT

A TFT LCD that can reflect incident lights and a fabrication method thereof are disclosed. The TFT LCD comprises plural bumps in each subpixel. Each bump has a stacked structure, which is formed with the TFTs simultaneously. The bumps can reflect and scatter incident light so as to promote the reflection performance of the TFT LCD.

54 Claims, 11 Drawing Sheets

TFT LCD AND FABRICATING METHOD THEREOF HAVING PARTICULAR REFLECTION BUMPS WITH STACKED STRUCTURE

BACKGROUND OF INVENTION

1. Field of the Invention

The invention relates to a thin film transistor (TFT) liquid crystal display (LCD), and more particularly, to a reflective TFT LCD or a transflective TFT LCD.

2. Description of the Prior Art

As technology of electronic products develops, human-machine interfaces such as displays are demanded for higher quality. Thin film transistor (TFT) Liquid crystal displays (LCDs) are characterized by portability, low power consumption and lack of radiation pollution, and thus are popularly used in various portable information products such as notebooks, personal digital assistants (PDAs), digital cameras, mobile phones et cetera. LCDs require external light sources to display images. Depending on the type of external source, LCDs can be divided into reflective LCDs, which use ambient lights, transmissive LCDs, which use backlight modules, and transflective LCDs, which use both ambient lights and backlight modules.

In general, since the light source of a reflective LCD is ambient light, the efficiency of ambient light reflection is one of the key factors affecting the display image quality of the reflective LCD. Similarly, when a transflective LCD is operated under a reflective mode, the reflectivity of the transflective LCD also determines whether the display image is good or not. Taking the reflective LCD as an example, pixel electrodes are used as reflective surfaces in the prior art, and pluralities of bumps are formed below the pixel electrodes to give the pixel electrodes rough surfaces in order to have a preferable scattering condition.

Please refer to FIG. 1. FIG. 1 is a sectional view of a portion of a reflective LCD 40 according to the prior art, wherein only a subpixel area is shown in FIG. 1. According to a method for fabricating a reflective LCD 40 of the prior art, a first conductive layer is deposited on a glass substrate 10, and a first photolithography and etching process (PEP) is performed to form a gate 12 in each subpixel area on the surface of the glass substrate 10. An insulating layer 14 is sequentially deposited on the glass substrate 10. Then, a semiconductor layer is formed on the insulating layer 14, and a second PEP is performed to form the TFT semiconductor channels 16. A second conductive layer is then formed on the glass substrate 10 and a third PEP is performed to form sources 18 and drains 20 in order to complete the fabrication of TFTs 22.

Then, a plurality of bumps 24 are formed in each of the subpixel areas by depositing a photoresist layer over all the subpixel areas and performing a fourth photolithography, developing, and baking process. Next, a passivation layer 26 is formed on the glass substrate 10 to cover the TFTs 22 and the bumps 24. A fifth photolithography and etching process is performed to expose a portion of each drain 20. Finally, a pixel electrode 28 is formed on the bumps 24 in each subpixel, through a sixth photolithography and etching process, which is electrically connected to the exposed drain 20. Since the metal pixel electrodes 28 are used as the reflective layer of the reflective LCD 40, the pixel electrodes 28 covering the bumps 24 also have comparatively rough surfaces, which can improve the scattering efficiency to promote the display image of the reflective LCD 40. However, in the above-mentioned prior art, at least one extra photomask is needed for defining the patterns of the bumps, and then a photolithography process, a development process, and a baking process also have to be performed to form the bumps for improving the scattering efficiency. Therefore, the complexity and cost of manufacture is high.

Technology to improve the scattering efficiency of reflective LCDs can also be applied to a transflective LCD. For example, pluralities of bumps can be formed by organic or silicon nitride non-conductive materials in each subpixel after forming TFTs and transparent pixel electrodes, and a reflective layer can be further formed on the bumps in each subpixel for reflecting and scattering light. According to this method, two depositing processes of thin films, two photomasks, and two photolithography and etching processs are additionally required for fabricating the bumps and reflection layer. Accordingly, this method costs much more than that of transflective LCDs without bumps, which have the disadvantage of lower light scattering efficiency.

Thus, how to fabricate a reflective LCD or a transflective LCD with improved light reflection efficiency but with lower manufacturing cost remains an important issue for manufacturers.

SUMMARY OF INVENTION

It is therefore a primary objective of the claimed invention to provide a method for fabricating a TFT LCD which forms a plurality of bumps in each subpixel and TFT at the same time, so that the fabrication cost can be reduced and the above-mentioned problem can be solved.

According to the claimed invention, the method of fabricating a TFT LCD comprises providing a transparent first substrate having a plurality of subpixel areas thereon, forming a first conductive layer on the surface of the first substrate, and etching the first conductive layer to define a gate of a TFT and a plurality of bottom bump patterns in each of the subpixel areas. The claimed method further comprises depositing an insulating layer over the first substrate, forming a semiconductor layer on the insulating layer, and etching the semiconductor layer to define a channel pattern of the TFT in each subpixel area on the surface of the insulating layer and to define at least a top bottom pattern on each bottom bump pattern. Then, a second conductive layer is deposited over the first substrate, wherein the material of the second conductive layer is reflective. The second conductive layer is then etched to define a source and a drain of the TFT in each of the subpixel areas and to define a reflective pattern layer covering the top bump patterns, a portion of the insulating layer, and the bottom bump patterns. After defining the pattern of the second conductive layer, a passivation layer is deposited over the first substrate and is etched to expose a portion of each drain surface. Finally, a pixel electrode is formed on a portion of the surface of the passivation layer in each subpixel area, wherein each pixel electrode is electrically connected to a corresponding drain.

According to the claimed invention, a TFT LCD is further disclosed. The TFT LCD comprises a first substrate, a second substrate parallel and opposite to the first substrate, and a liquid crystal layer positioned between the first substrate and the second substrate. The inner surface of the second substrate has a plurality of subpixels, wherein each subpixel comprises a TFT, a plurality of reflection bumps, and a pixel electrode covering the reflection bumps and a portion of the TFT. Each TFT further comprises a gate, an insulating layer, a semiconductor channel, a source, and a drain electrically connecting the pixel electrode. Each of the reflection bumps is a stacked structure, comprising a conductive layer, an insulating layer, and a reflective pattern layer, wherein the material of the reflective pattern layer has reflectivity for reflecting incident light.

It is an advantage of the claimed invention that the stacked layers of the reflection bumps are formed together with the gates, the semiconductor channels, the sources, and drains. Therefore, when fabricating a reflective LCD, at least a photomask, a photolithography process, and an etching process can be omitted in contrast to the prior art. On the other hand, when the claimed invention method is applied to fabricating a transflective LCD, at least two photomasks, two photolithography processes, and two etching process can be omitted in contrast to the prior art. Accordingly, fabrication cost and time can be greatly saved. In addition, the claimed invention method is easily able to change the area of each stacked layer of the reflection bumps to adjust the convex angles of the reflection bumps according to various requirements and design considerations of different LCDs so that the roughness of reflective pattern layer surface can be adjusted to meet preferable reflection and scattering performance requirements. Therefore, the claimed invention can be applied to both reflective LCDs and transflective LCDs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
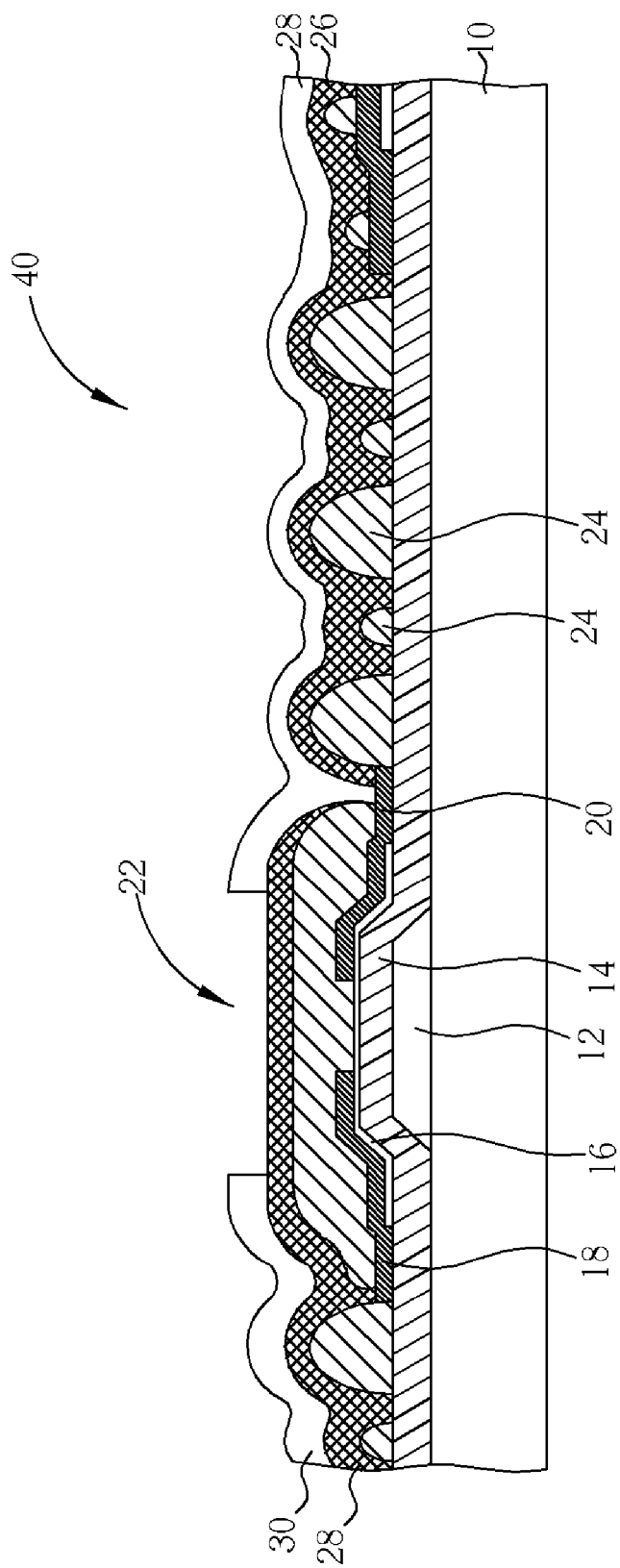
FIG. 1 is a section view of a portion of a reflective LCD according to the prior art.
Figure 2:
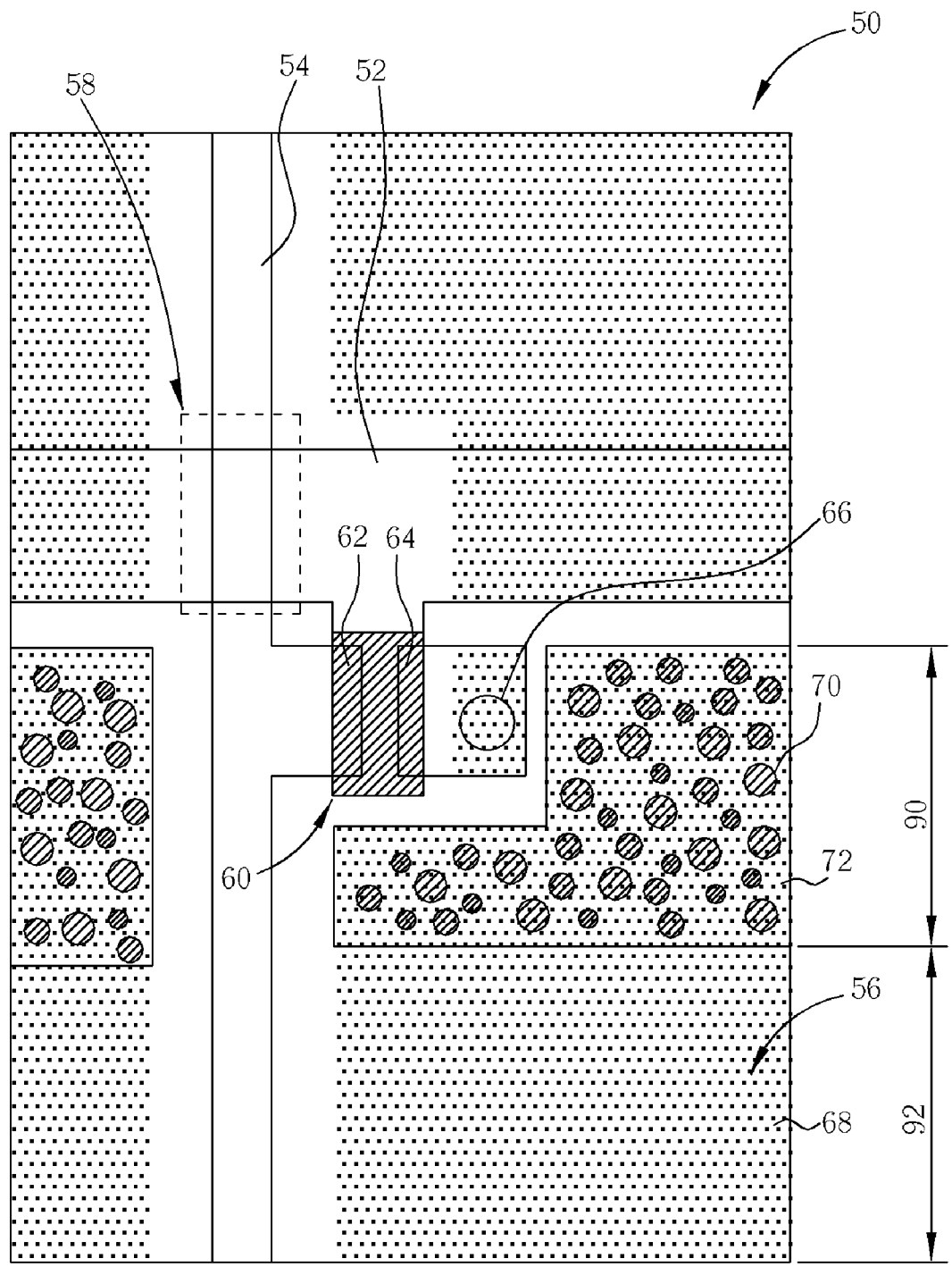
FIG. 2 is a top view of a portion of a TFT LCD according to a first embodiment of the present invention.

Please refer to FIGS. 2-6. FIG. 2 is a top view of a portion of a TFT LCD 50 according to a first embodiment of the present invention, while FIGS. 3-6 are schematic diagrams of the fabricating process of the TFT LCD 50 shown in FIG. 2. In this embodiment, the TFT LCD 50 is a transflective LCD. As shown in FIG. 2, the TFT LCD 50 comprises a plurality of scan lines 52 and a plurality of data lines 54 (please note only one scan line 52 and one data line 54 is shown in FIG. 2). The scan lines 52 and the data lines 54 are arranged perpendicularly to define pluralities of subpixels 56, wherein the scan lines 52 and the data lines 54 are formed in different planes and cross perpendicularly in each cross over region 58. The TFT LCD 50 further comprises a plurality of TFTs 60, where each TFT 60 is positioned in a subpixel 56. The source 62 of each TFT 60 is electrically connected to a data line 54, and the drain 64 is electrically connected to a pixel electrode 68 through a via hole 66 in each subpixel 56. Each subpixel 56 of the present invention TFT LCD 50 further comprises a plurality of reflection bumps 70 that have a reflective pattern layer 72 thereon for reflecting incident light to provide a reflective function of the TFT LCD 50. In this embodiment, the reflection bumps 70 are positioned centrally in a light-reflecting region 90 of each subpixel 56. On the other hand, the areas of the subpixels 56 where the reflection bumps 70, the reflective pattern layer 72 and the TFT 60 are not positioned form a light-transmitting region.

Figure 3:
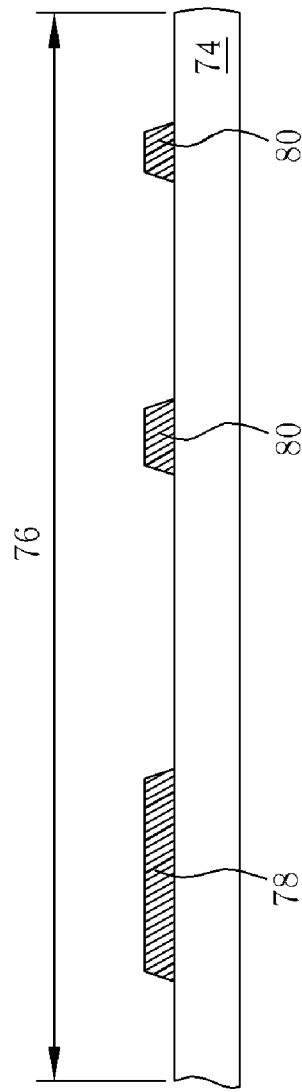
FIGS. 3-6 are schematic diagrams of the fabricating process of the TFT LCD shown in FIG. 2.

The fabrication process of the present invention TFT LCD 50 is shown in FIGS. 3-6. First, a transparent first substrate 74 is provided, wherein the first substrate 74 may be a glass substrate, a quartz substrate, or other non-conductive transparent substrates. A first conductive layer is then formed on the surface of the first substrate 74 by a material such as aluminum (Al), chromium (Cr), titanium (Ti), tungsten (W), tantalum (Ta), alloy, or a combination of materials mentioned above. A first photolithography and etching process (PEP) is performed on the first conductive layer for forming a scan line 52 in each cross over region 58 on the surface of the first substrate 74, and forming a gate 78 and a plurality of bottom bump patterns 80 in each subpixel area 76 at the same time. In FIG. 3, only two bottom bump patterns 80 are shown for description. As shown in FIG. 3, the sizes and shapes of the bottom bump patterns 80 are not necessarily uniform.

Figure 4:
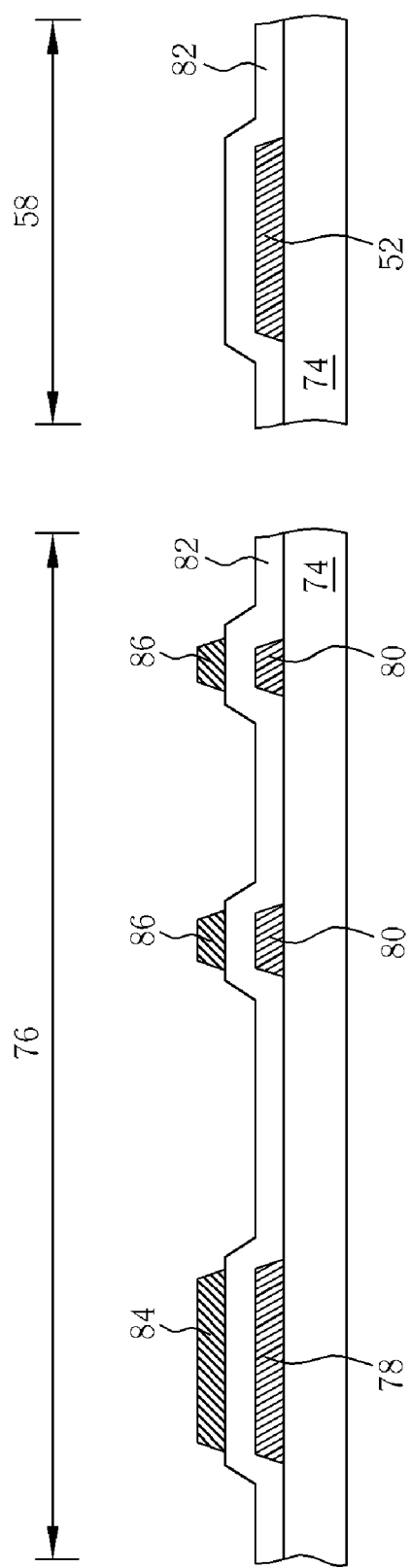

Please refer to FIG. 4, which shows an insulating layer 82 and a semiconductor layer formed sequentially on the overall first substrate 74, wherein the insulating layer 82 serves as the gate insulating layer of each TFT 60, which is formed with silicon oxide, silicon nitride, or silicon oxynitride. A second PEP is then performed on the semiconductor layer for defining a channel pattern 84 of each TFT 60 and at least a top bottom pattern 86 on each bottom bump pattern 80.

Figure 5:
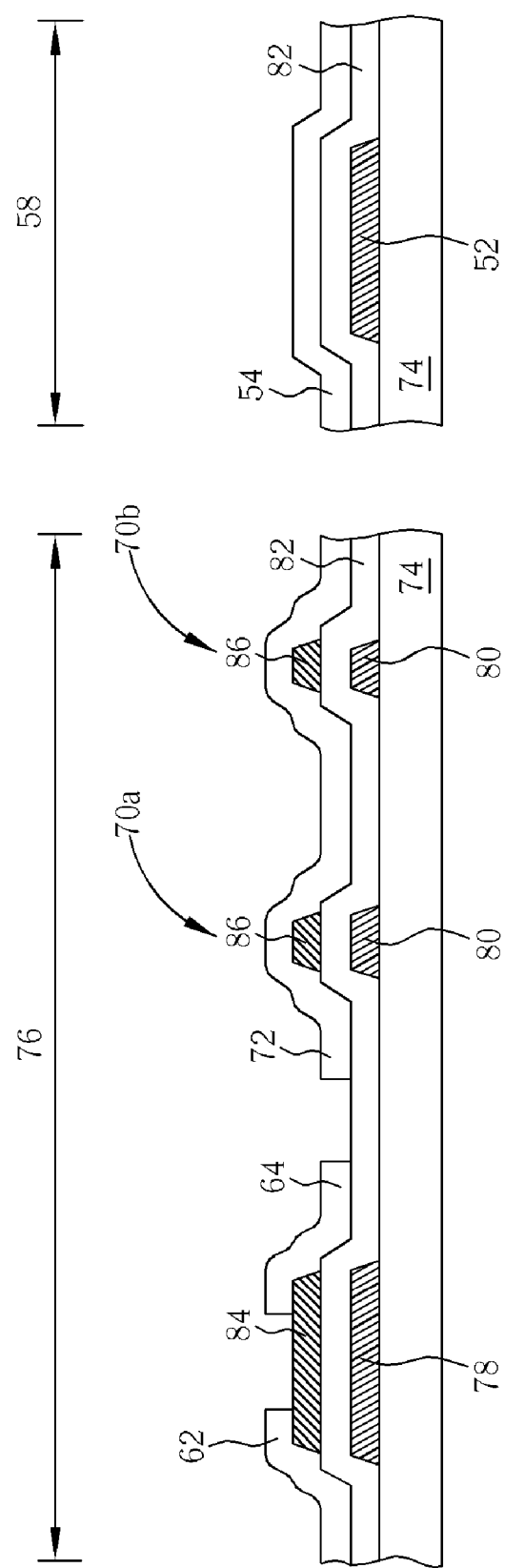

Please refer to FIG. 5. A second conductive layer is formed on the overall first substrate, formed by a material with reflective properties, preferably aluminum, chromium, titanium, tungsten, tantalum, alloy, or a combination of materials mentioned above. After that, a third PEP is performed for defining a source 62 and drain 64 of each TFT 60, and defining a data line 54 simultaneously. In addition, when performing the third PEP, a reflective pattern layer 72 is also defined in each subpixel area 76, wherein the reflective pattern layer 72 covers the whole top bump pattern 86, a portion of the insulating layer 82, and the bottom bump patterns 80. Since the reflective pattern layer 72 is formed with a reflective material, ambient light will be reflected by the reflective pattern layer 72 and pass through the liquid crystal layer of the TFT LCD 50 to form display images when ambient light propagates to the reflective pattern layer 72.

As shown in FIG. 5, the portions of the reflective pattern layer 72 covering the top bump patterns 86 and the bottom bump patterns 82 have relative convexes, so that pluralities of reflection bumps 70a, 70b are formed on the surface of the first substrate 74. That is to say, both reflection bumps 70a, and 70b are a stacked structure comprising a bottom bump pattern 80, an insulating layer 82, a top bump pattern 86, and a reflective pattern layer 72. The material of the bottom bump patterns 80 is the same as that of the gate 78; the material of the top bump patterns 86 is the same as the material of the semiconductor channels 84; and the material of the reflective pattern layers 72 is the same as that of the source 62 and the drain 64 of each TFT 60. In addition, the size of each top bump pattern 86 is smaller than the size of each bottom bump pattern 80, so that both reflection bumps 70a, and 70b have a section shape similar to a semicircle, resulting in preferable light scattering performance.

It should be noted that the sizes, the shapes, and the lengths of the reflection bumps 70a, 70b do not need to be uniform and could be varied according to their individual positions and scattering demands. As shown in FIG. 5, the reflection bumps 70*a* and 70*b* are of different sizes. Furthermore, the establishment position of the top bump patterns 86 to the bottom bump patterns 80 is adjustable, in order to form reflection bumps with reflection inclined planes of a specific angle so as to solve such problems as visual angle and color deviation of an LCD. In addition, different amounts of top bump patterns 86 can be located on each of the bottom bump patterns 80, for adjusting the protruding angles of the reflection bumps 70*a*, 70*b*.

Figure 6:
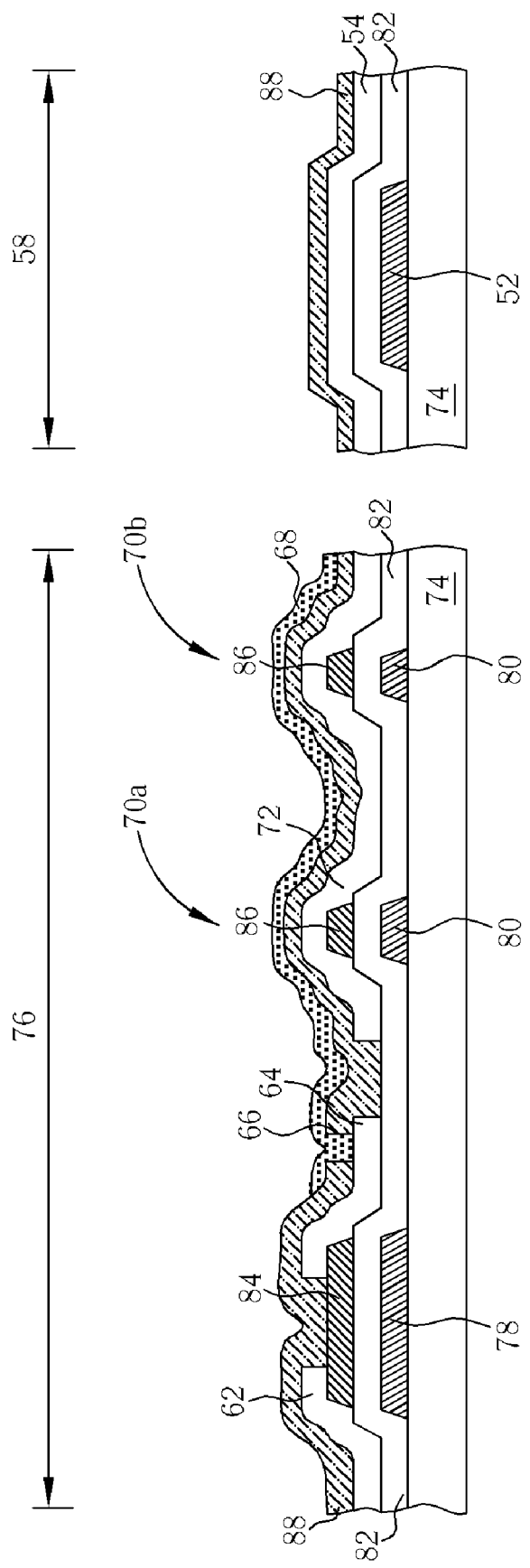

Please refer to FIG. 6. A passivation layer 88 formed with silicon oxide or silicon nitride is deposited above the first substrate 74. Then, a fourth PEP is performed to remove a portion of the passivation layer 88 located on the drain 64 of each TFT 60 to form a via hole 66 that penetrates the passivation layer 88 to the surface of the drain 64 and exposes a portion of the drain 64. Finally, a transparent conductive layer, formed with indium tin oxide (ITO) or indium zinc oxide (IZO), is formed on the overall first substrate 74, and a fifth PEP process is performed to form pluralities of pixel electrodes 68 electrically connected to the drain 64 of each TFT 60.

Figure 7:
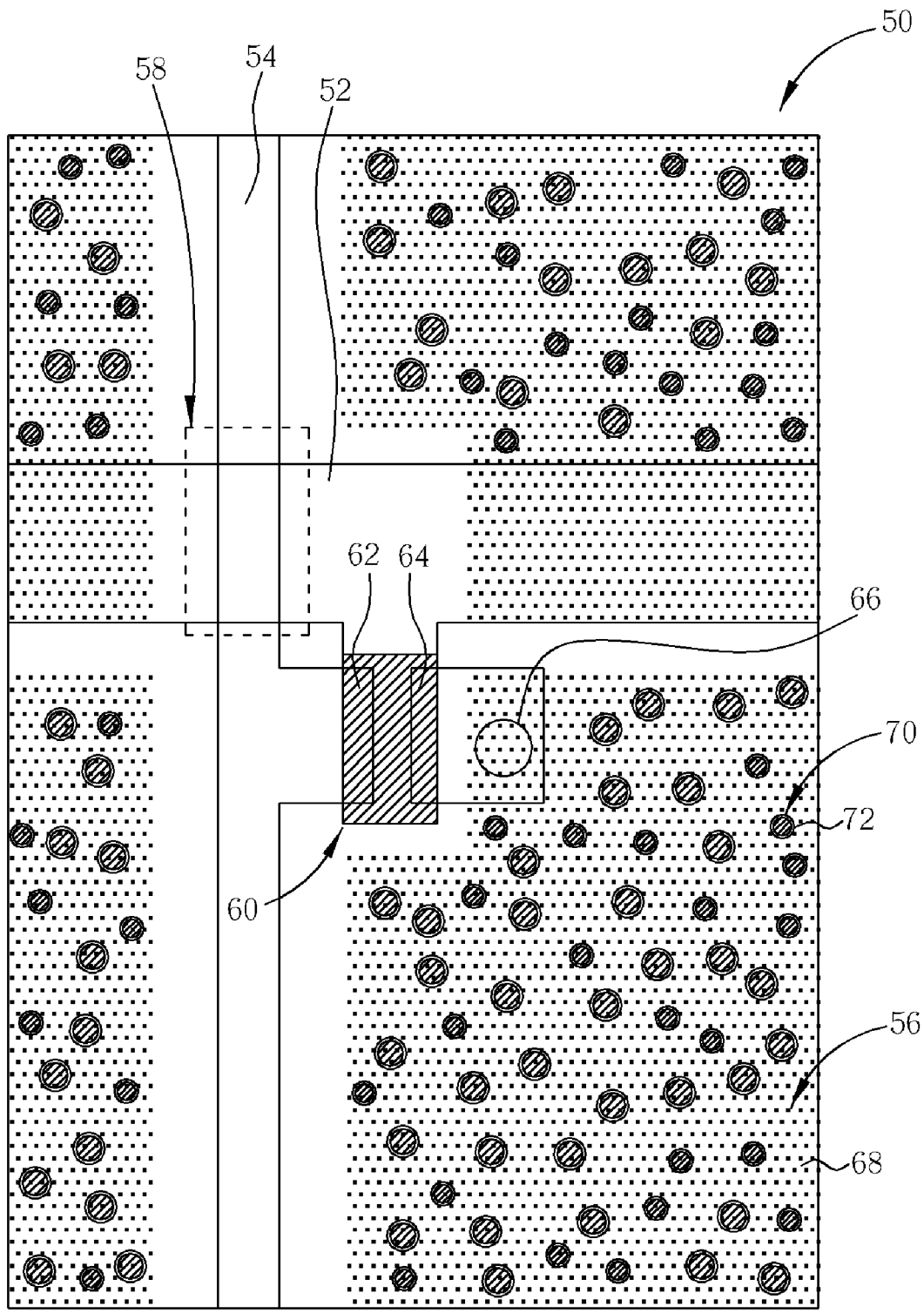
FIGS. 7-8 are schematic diagrams of a portion of a TFT LCD according to a second embodiment of the present invention.
Figure 8:
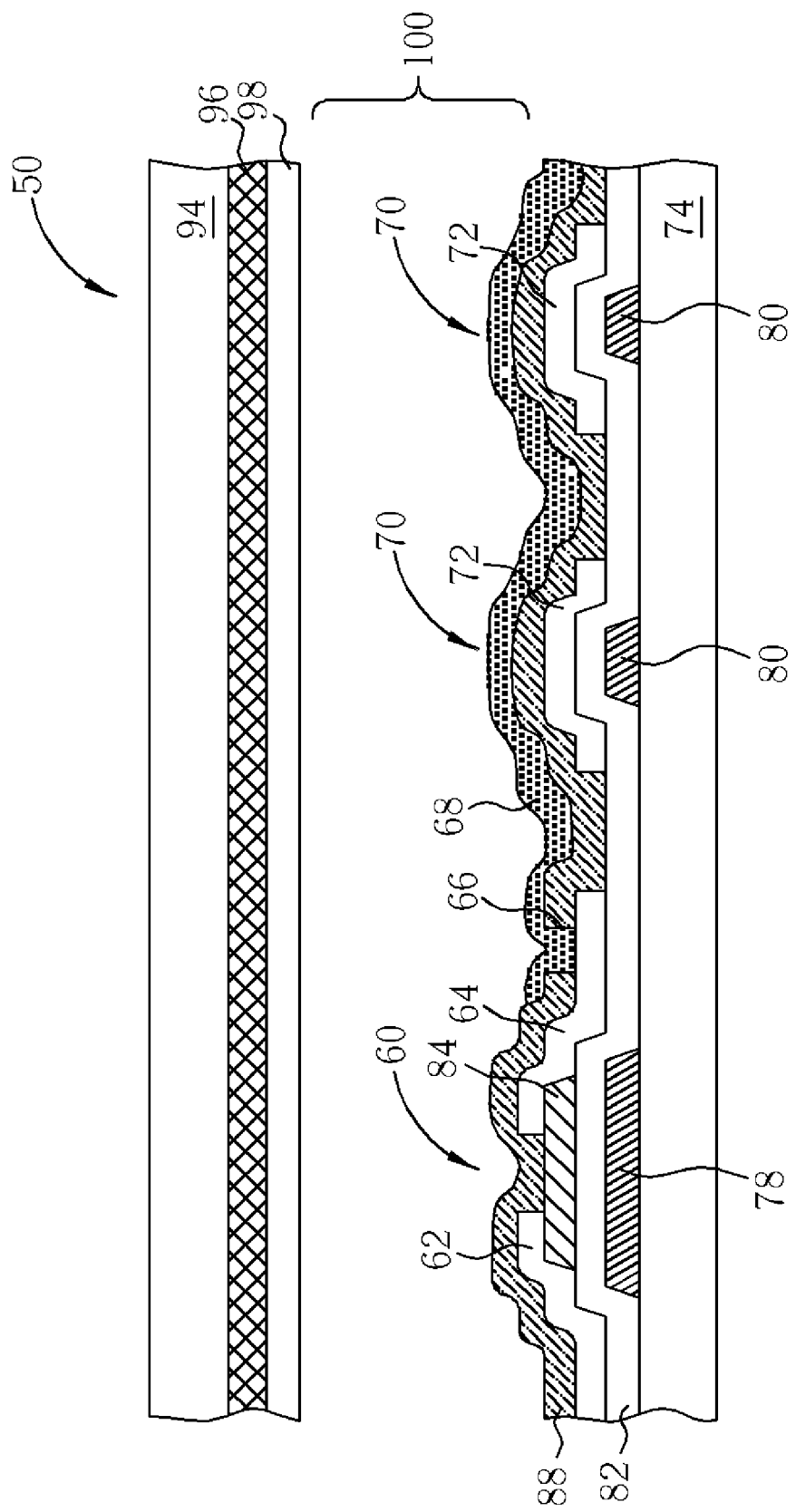

Please refer to FIGS. 7 and 8, which are schematic diagrams of the TFT LCD 50 according to a second embodiment of the present invention, wherein the numerals given to each element are the same as that in FIGS. 2-6. In this embodiment, the TFT LCD 50 is also a transflective LCD. As shown in FIG. 7, the reflection bumps 70 are distributed in each subpixel 56, wherein each reflection bump 70 contains an individual reflective pattern layer 72 thereon for reflecting incident light. Since the reflection bumps 70 with corresponding reflective pattern layers 72 are distributed evenly in the subpixels 56, the area of each subpixel 56 is not divided into a light-reflecting region and a light-transmitting region as in the first embodiment of the present invention. It should be noted that the distribution density, amount, and size of the reflection bumps 70 can be designed according to the demand of the light reflection functionality of the TFT LCD 50. For example, when the design of the TFT LCD 50 only requires a micro-reflective functionality, the LCD designer can lower the amount and density of the reflection bumps 70. Accordingly, as the TFT LCD 50 is operated under a power-save mode so that only a low illumination is provided by its backlight, a little incident light can still be reflected to enhance the display image quality.

As shown in FIG. 8, besides the size and position density, the composition of the stacked structure of the reflection bumps 70 can also be changed so as to change the size of the reflection bumps 70 for adjusting the roughness and the convex of the surface of the reflective pattern layer 72. In this embodiment, the stacked structure of each reflection bump 70 only comprises a bottom bump pattern 80, an insulating layer 82, and a reflective pattern layer 72. Therefore, the protruding angles of the reflection bumps 70 are smaller than that of the reflection bumps in the first embodiment of the present invention. Similarly, even in a single subpixel area, some reflection bumps 70 can be designed to contain more stacked layers whereas other reflection bumps 70 contain fewer stacked layers according to actual requirements of the LCD design so that the preferable light reflection performance can be met. Furthermore, since the reflection bumps 72 of this embodiment are distributed sparsely, each reflective pattern layer 72 on the reflection bumps 70 does not contact with each other. In this situation, the edge of each reflective pattern layer 72 protruding from the insulating layer 82 also has the function of scattering incident light, which improves the light scattering performance.

In addition, the present invention method of fabricating the TFT LCD 50 further comprises providing a transparent second substrate 94 parallel with and above the first substrate 74, and a liquid crystal layer 100 sandwiched between the first substrate 74 and the second substrate 94. The second substrate 94 is a glass substrate or a quartz substrate and has at least a color filter 96 and a common electrode 98 on its inner surface. The inner surfaces of the first substrate 74 and the second substrate 94 further comprise a respective alignment film (not shown) for adjusting the arrangement direction of liquid crystal molecules. In addition, the TFT LCD 50 also comprises other elements such as polarizers and backlight unit, which are well known by those skilled in the art, thus a detailed description of those elements will not be illustrated herein.

Figure 9:
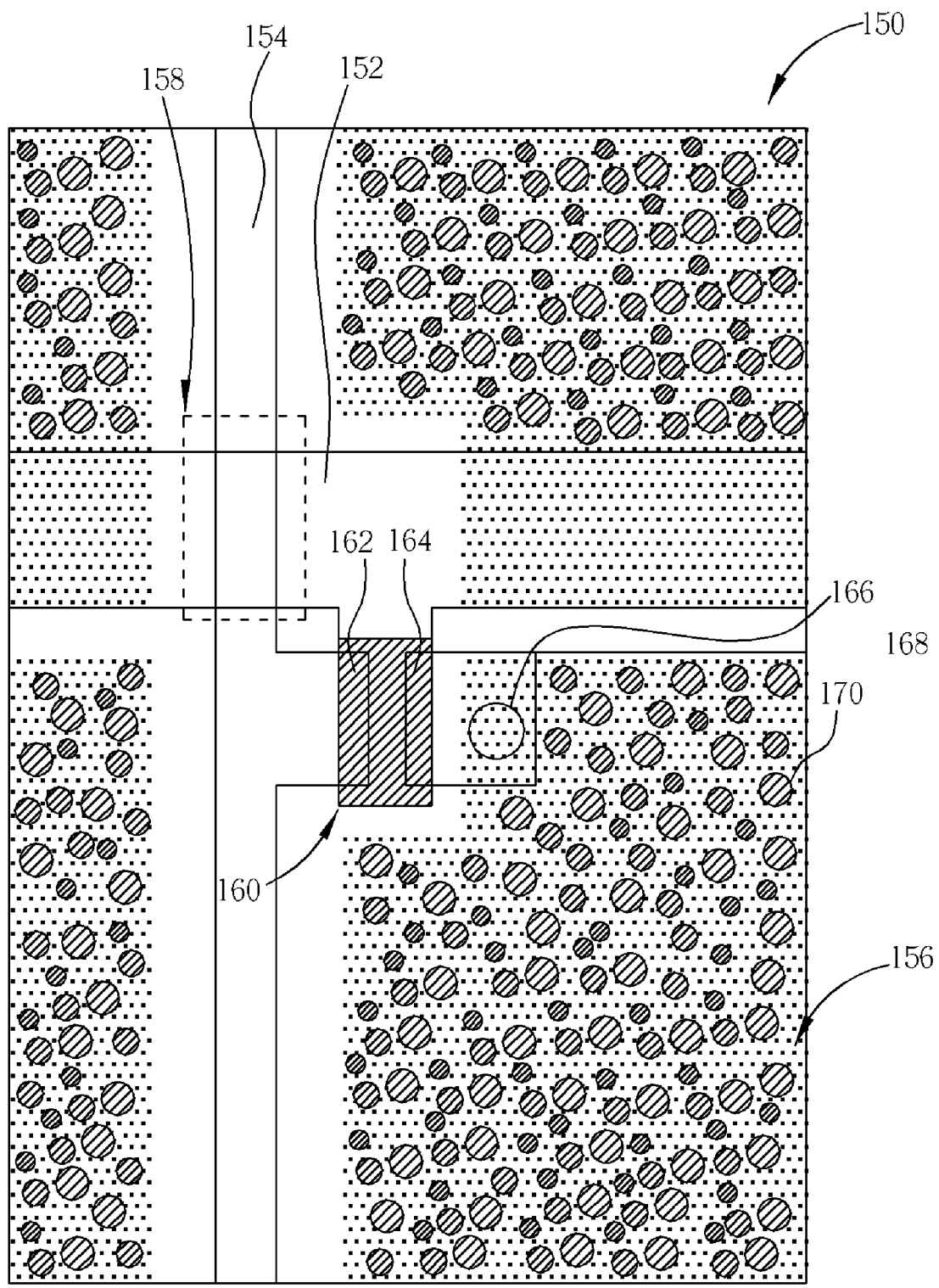
FIGS. 9-10 are schematic diagrams of a portion of a TFT LCD according to a third embodiment of the present invention.

Please refer to FIG. 9. FIG. 9 is a schematic diagram of a portion of a TFT LCD 150 according to a third embodiment of the present invention. The TFT LCD 150 is a reflective LCD, comprising a plurality of scan lines 152 and a plurality of data lines 154 arranged perpendicular to each other and crossing in a plurality of cross over regions 158, which divide the display area of the TFT LCD 150 into a plurality of subpixels 156. Each subpixel 156 includes a TFT 160 and a pixel electrode 168. Each TFT 160 comprises a source 162 and drain 164, and the source 162 is electrically connected to a corresponding data line 154, whereas the drain 164 is electrically connected to the pixel electrodes 168 through a via hole 166. The TFT LCD 150 is a reflective LCD, so the pixel electrodes 168 are formed with reflective materials, preferably with metal materials, such as aluminum, chromium, titanium, tungsten, tantalum, alloy, or a combination of materials mentioned above. In addition, a plurality of reflection bumps 170 are disposed in each subpixel 156, densely distributed below the corresponding pixel electrodes 168. Since the pixel electrodes 168 are formed with reflective materials and cover the reflection bumps 170, they serve as reflective pattern layers of the reflection bumps 170. Therefore, the pixel electrodes 168 positioned on the reflection bumps 170 have rough surfaces that reflect light with preferable light scattering performance.

Figure 10:
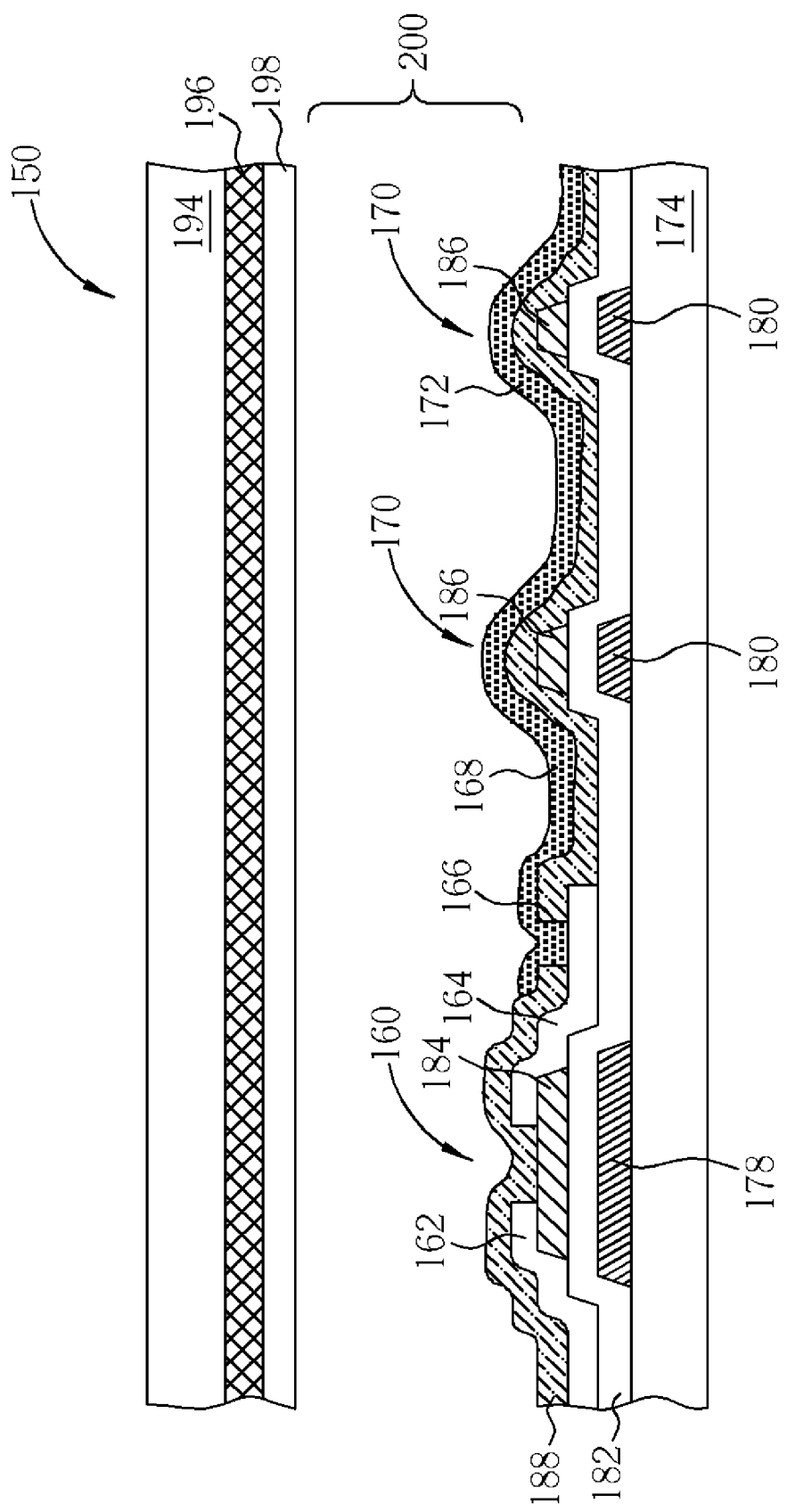

Please refer to FIG. 10, which is a section view of the TFT LCD 150 shown in FIG. 9. On the inner surface of the first substrate 174 is disposed a pluralities of TFTs 160, where each TFT 160 comprises a gate 178, a gate insulating layer 182, a semiconductor channel 184, a source 162, and a drain 164. Each reflection bump 170 is a stacked structure that comprises a bottom bump pattern, a gate insulating layer 182, a top bump pattern 186, a passivation layer 186, and a reflective pattern layer 172. The material of the bottom bump patterns 180 is the same as the material of the gate 178; the top bump pattern 186 is formed with a semiconductor layer, the same as the semiconductor channel 184; and the reflective pattern layer 172 is a portion of the pixel electrodes 168.

In addition, as shown in FIG. 10, the TFT LCD 150 further comprises a second substrate 194 arranged in parallel and above the first substrate 174, which has at least a color filter 196 and a common electrode 198 on its inner surface. The TFT LCD 150 even comprises a liquid crystal layer 200 positioned between the first substrate 174 and the second substrate 194. With the combination of TFTs 160 arranged in a matrix, the pixel electrodes 168, the scan lines 152 and the data lines 154 positioned in different planes, and the color filter 196, and other electrical elements, such as capacitances and electrical connecting pad (not shown), the TFT LCD 150 produces colorful display images through driving liquid crystal molecules positioned above each subpixel 156 to rotate and reflect incident light by the pixel electrodes 168 through the rotated liquid crystal molecules.

Figure 11:
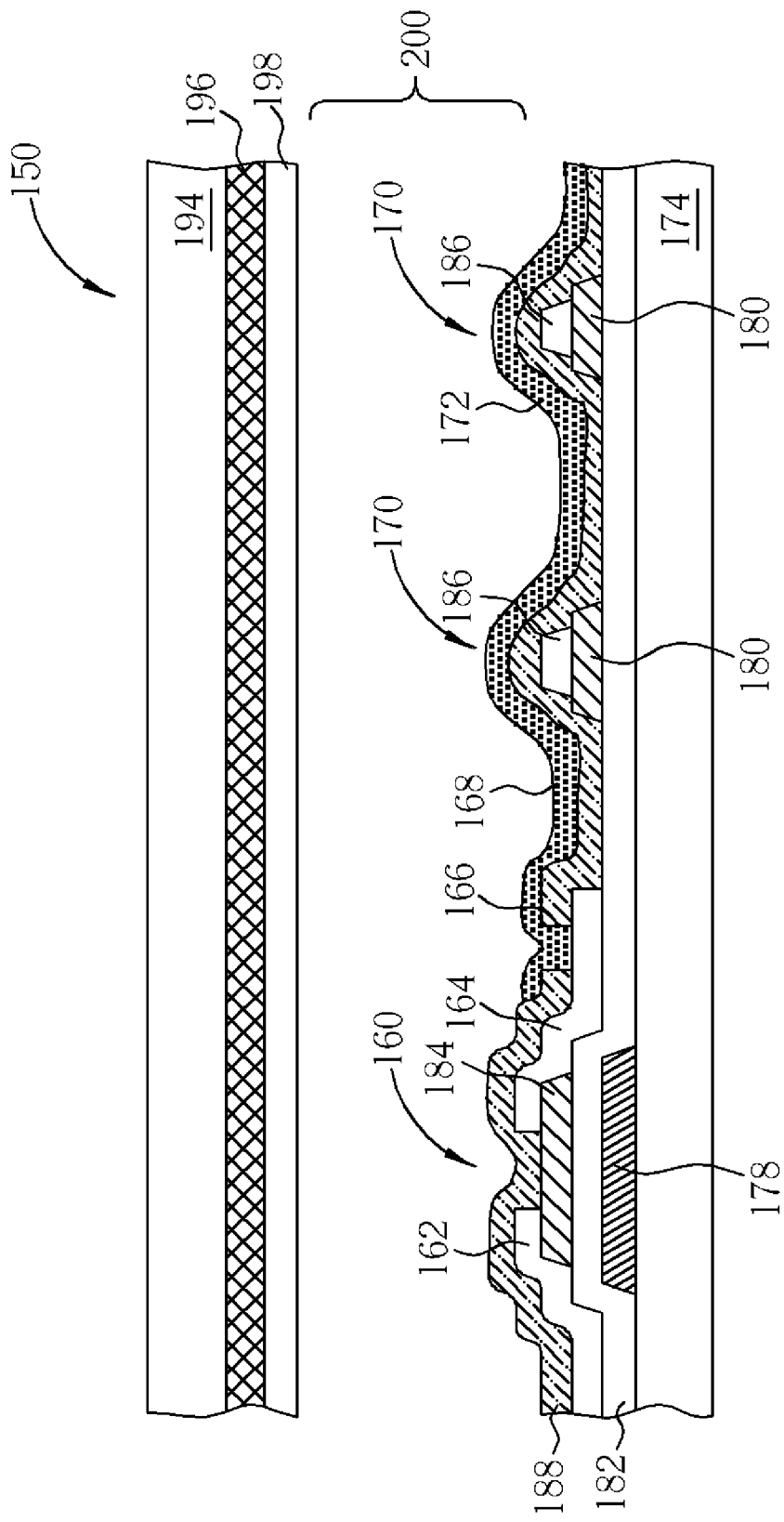
FIG. 11 is a schematic diagram of a portion of a TFT LCD according to a fourth embodiment of the present invention.

Please refer to FIG. 11. FIG. 11 is a section view of a portion of a TFT LCD 150 according to a fourth embodiment of the present invention, wherein the TFT LCD 150 is a reflective LCD. For illustration purposes, the numeral given to each element is the same as that in FIG. 10. In this embodiment, each reflection bump 170 is a stacked structure comprising a gate insulating layer 182, a bottom bump pattern 180, a top bump pattern 186, a passivation layer 188, and a reflective pattern layer 172. The bottom bump patterns 180 are formed together with the semiconductor channels 184 of TFTs 160. This means the semiconductor layer is etched to define the patterns of the semiconductor channels 184 and define the bottom bump patterns 180 simultaneously. On the other hand, the top bump patterns 186, the source 162 and the drain 164 of each TFT 160 are formed at the same time, so that the top bump patterns 186 are defined on the bottom bump patterns 180 in order to make the bottom bump patterns 180 and the top bump patterns 186 a stacked structure forming comparative bumps. Then, a passivation layer 188 is deposited over the semiconductor layer to expose a portion of each drain 164. Pixel electrodes 168 are then formed in each subpixel 156, which cover the bottom bump patterns 180, the top bump patterns 186, and the passivation layer 188. Since the TFT LCD 150 is a reflective LCD, the pixel electrodes 168 are formed with reflective materials, such as metal, for fully reflecting incident light. Accordingly, the pixel electrodes 168 positioned above the bottom bump patterns 180 and the top bump patterns 186 serve as reflective pattern layers 172 of reflection bumps 170 to enhance the scattering performance of the light reflection. It is an advantage of this embodiment that the photomask layout for defining the pattern of the gate 178 in the prior art does not need to be changed, and only the photomask layout for defining the pattern of the sources 162 and drains 164, and the pattern of the semiconductor channels 184 need to be adjusted. Therefore, the cost of photomasks via revising layout design can be saved.

In conclusion, the present invention provides a method to fabricate pluralities of reflection bumps together with fabricating the TFTs through usual processes, so that the reflective pattern layers or the reflective pixel electrodes on the first substrate have rough surfaces to improve the scattering performance when reflecting incident light. In contrast to the prior art that utilizes extra photomasks and fabricating processes, such as depositing and photolithography processes, the present invention can improve display image quality and save the cost of manufacture effectively at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating a thin film transistor (TFT) liquid crystal display (LCD), the method comprising:
   providing a first substrate;
   providing a second substrate, the second substrate being arranged parallel and below the first substrate, the second substrate having a plurality of subpixels on its inner face, wherein each of the subpixels comprises:
      a TFT comprising a gate, a gate insulating layer, a semiconductor channel, a source, and a drain;
      a plurality of reflection bumps positioned in the subpixel for scattering incident light, each of the reflection bumps being a stacked structure comprising a reflective pattern layer and a bump pattern layer, the reflective pattern layer being formed with reflective material for reflecting incident light, and the bump pattern layer being formed with at least two elements selected from the group of the gate, the gate insulating layer, the semiconductor channel, the source, and the drain in a same step; and
      a pixel electrode covering the reflection bumps and a portion of the TFT, being electrically connected to the drain; and
   providing a liquid crystal layer, the liquid crystal layer being positioned between the first substrate and the second substrate.

2. The method of claim 1, wherein the TFT LCD is a transflective LCD.

3. The method of claim 1, wherein each of the reflection bumps comprises a bottom bump pattern, the gate insulating layer, and the reflective pattern layer.

4. The method of claim 3, wherein each of the reflection bumps further comprises a top bump pattern.

5. The method of claim 4, wherein each of the reflection bumps further comprises at least one other layer.

6. The method of claim 5, wherein the at least one other layer is at least one passivation layer.

7. The method of claim 4, wherein the size of the top bump pattern is approximately smaller than the size of the bottom bump pattern of each of the reflection bumps.

8. The method of claim 1, wherein the sizes of the reflection bumps are not uniform.

9. The method of claim 1, wherein the gate insulating layer is an oxide layer, a nitride layer or an oxynitride layer.

10. The method of claim 1, wherein the second substrate is a glass substrate or a quartz substrate.

11. The method of claim 1, wherein each of the pixel electrodes is an indium tin oxide (ITO) layer or an indium zinc oxide (IZO) layer.

12. A TFT LCD, the TFT LCD comprising:
   a first substrate;
   a second substrate arranged parallel and below the first substrate, the second substrate having a plurality of subpixels on its inner face, wherein each of the subpixels comprises:
      a TFT comprising a gate, a gate insulating layer, a semiconductor channel, a source, and a drain;
      a plurality of reflection bumps positioned in the subpixel for scattering incident light, each of the reflection bumps being a stacked structure comprising a reflective pattern layer and a bump pattern layer, the reflective pattern layer being formed with reflective material for reflecting incident light, and the bump pattern layer being formed with at least two elements selected from the group of the gate, the gate insulating layer, the semiconductor channel, the source, and the drain of the TFT in a same step; and
      a pixel electrode covering the reflection bumps and a portion of the TFT, being electrically connected to the drain; and
   a liquid crystal layer positioned between the first substrate and the second substrate.

13. The TFT LCD of claim 12, wherein each of the reflective pattern layers covers each of the entire bump pattern layers.

14. The TFT LCD of claim 12, wherein the second substrate further contains a passivation layer thereon, which covers the reflection bumps and the TFTs and exposes a portion of each of the drains so that each of the pixel electrodes is electrically connected to one of the drains.

15. The TFT LCD of claim 12, wherein when each of the bump pattern layers is stacked with an insulating layer and a conductive layer, the bump pattern layer further comprises a semiconductor layer positioned above the insulating layer.

16. The TFT LCD of claim 15, wherein the area of each of the semiconductor layers is approximately smaller than the area of each of the conductive layers.

17. The TFT LCD of claim 15, wherein a material of the semiconductor layers is the same as a material of the semiconductor channels.

18. The TFT LCD of claim 15, wherein a material of the conductive layers is the same as a material of the gates.

19. The TFT LCD of claim 15, wherein a material of the insulating layers is the same as a material of the gate insulating layers.

20. The TFT LCD of claim 15, wherein a material of the conductive layer is aluminum, chromium, titanium, tungsten, tantalum, alloy, or a combination of any two or more of these materials.

21. The TFT LCD of claim 12, wherein a material of the reflective pattern layer is the same as materials of the drains and the sources.

22. The TFT LCD of claim 12, wherein sizes of the reflection bumps are not uniform.

23. The TFT LCD of claim 12, wherein each of the subpixels further comprises a light-reflecting region and a light-transmitting region.

24. The TFT LCD of claim 23, wherein the reflection bumps of each of the subpixels is positioned centrally in the light-reflecting region of the subpixel.

25. The TFT LCD of claim 12, wherein the reflection bumps of each of the subpixels are dispersedly distributed in the subpixel.

26. The TFT LCD of claim 12, wherein each of the gate insulating layers is an oxide layer, a nitride layer, or an oxynitride layer.

27. The TFT LCD of claim 12, wherein the first substrate and the second substrate are a glass substrate or a quartz substrate individually.

28. The TFT LCD of claim 12, wherein each of the pixel electrodes is a transparent pixel electrode.

29. The TFT LCD of claim 28, wherein each of the pixel electrodes is an ITO layer or an IZO layer.

30. The TFT LCD of claim 12, further comprising a plurality of color filters positioned in the inner surface of the first substrate.

31. The TFT LCD of claim 12, further comprising a common electrode positioned on the inner surface of the first substrate.

32. The TFT LCD of claim 12, wherein the TFT LCD is a transflective TFT LCD.

33. The TFT LCD of claim 12, wherein the TFT LCD is a reflective TFT LCD.

34. The TFT LCD of claim 33, wherein the reflective pattern layer is a portion of the pixel electrode.

35. A reflective TFT LCD, the reflective TFT LCD comprising:
   a first substrate;
   a second substrate positioned parallel and below the first substrate, the inner surface of the second substrate comprising a plurality of subpixels, and each of the subpixels comprising:
      a TFT, comprising a gate, a gate insulating layer, a semiconductor channel, a source, and a drain;
      a pixel electrode positioned in the subpixels and being electrically connected to the drain, wherein a material of the pixel electrode has light reflectivity; and
      a plurality of reflection bumps positioned in the subpixel for scattering incident light, each of the reflection bumps being a stacked structure comprising a reflective pattern layer and a bump pattern layer; wherein the reflective pattern layer is a portion TFT the pixel electrode, and the composition of the bump pattern layer is formed with at least two elements selected from the group of the gate, the gate insulating layer, the semiconductor channel, the source, and the drain of the TFT in a same step; and
   a liquid crystal layer sandwiched between the first substrate and the second substrate.

36. The reflective TFT LCD of claim 35, wherein the reflective pattern layer covers the entire bump pattern layers.

37. The reflective TFT LCD of claim 35, wherein the second substrate further comprises a passivation layer thereon, covering the bump pattern layer of each of the reflection bumps and the TFTs and exposing a portion of each of the drains so that each of the pixel electrodes is electrically connected to each of the drains.

38. The reflective TFT LCD of claim 37, wherein each of the stacked structures comprises the passivation layer.

39. The reflective TFT LCD of claim 35, wherein each of the stacked structures comprises a conductive layer, an insulating layer, a semiconductor layer, and the reflective pattern layer from bottom to top.

40. The reflective TFT LCD of claim 39, wherein the area of the semiconductor layer is approximately smaller than the area of the conductive layer of each of the stacked structures.

41. The reflective TFT LCD of claim 39, wherein a material of the conductive layers is the same as a material of the gates.

42. The reflective TFT LCD of claim 35, wherein each of the stacked structures comprises an insulating layer, a semiconductor layer, a conductive layer, and the reflective pattern layer from bottom to top.

43. The reflective TFT LCD of claim 42, wherein the area of the conductive layers is approximately smaller than the area of the semiconductor layer of each of the stacked structures.

44. The reflective TFT LCD of claim 42, wherein a material of the conductive layers is the same as a material of the sources and the drains.

45. The reflective TFT LCD of claim 42, wherein a material of the semiconductor layers is the same as a material of the semiconductor channels.

46. The reflective TFT LCD of claim 42, wherein a material of the insulating layers is the same as a material of the gate insulating layers.

47. The reflective TFT LCD of claim 42, wherein a material of the conductive layers is aluminum, chromium, titanium, tungsten, tantalum, alloy, or a combination of any two or more of these material.

48. The reflective TFT LCD of claim 35, wherein the sizes of the reflection bumps are not uniform.

49. The reflective TFT LCD of claim 35, wherein the reflection bumps of each of the subpixels are distributed dispersedly in the subpixel.

50. The reflective TFT LCD of claim 35, wherein a material of the pixel electrodes is aluminum, chromium, titanium, tungsten, tantalum, alloy, or a combination of any two or more of these materials.

51. The reflective TFT LCD of claim 35, wherein the first substrate and the second substrate is a glass substrate or a quartz substrate individually.

52. The reflective TFT LCD of claim 35, wherein each of the gate insulating layers is an oxide layer, a nitride layer, or an oxynitride layer.

53. The reflective TFT LCD of claim 35, further comprising a plurality of color filters positioned on the inner surface of the first substrate.

54. The reflective TFT LCD of claim 35, further comprising a common electrode positioned on the inner surface of the first substrate.

* * * * *